Patented Oct. 21, 1947

2,429,319

UNITED STATES PATENT OFFICE 2,429,319

METHOD OF PRODUCING EASILY PULVERIZED XEROGEL

Kenneth K. Kearby, Elizabeth, N. J., assignor to Standard Oil Development Company, a corporation of Delaware No Drawing. Application March 26, 1943, Serial No. 480,654

3 Claims. (Cl. 252—317)

This invention relates to a process for the manufacture of dried hydrous oxides from colloidal solutions and, more particularly, to the manufacture of an improved low-density gel.

Gelatinous masses may be divided into two classes, the gelatinous precipitates and the jellies according to whether the product formed settles out in a flocculent mass or occupies the entire volume that the original solution occupied and appears microscopically homogeneous.

The most widely used of the inorganic gels in the dried condition is that of silica with or without the addition of other gelatinous materials, such as alumina. Most of the silica gel now used commonly in industry is made by mixing rapidly a solution of water glass with a solution of some suitable salt or acid, usually the latter, and allowing the mixture to stand until it becomes a stiff jelly. The jelly is then broken up, washed free from salts, and allowed to dry slowly. It shrinks greatly in drying, and when completely dry, it is a very hard glassy mass. These materials are designated in the art as xerogels. They are to be distinguished from aerogels in that they can be immersed in water and subsequently dried at an elevated temperature and atmospheric pressure without changing materially the apparent density and other physical properties.

These properties of these dried gels make them particularly suitable as catalysts or catalyst carriers in many chemical reactions and as adsorbents for the refining of oils. They have been found particularly suitable for promoting the catalytic conversion of hydrocarbons. However, due to the extreme hardness of the dried product, the preparation of a suitable powdered catalyst from these gels has been difficult. Powdered catalysts are especially useful in the new type of hydrocarbon conversions in which powdered catalysts are suspended in the gases or vapors being converted. These powders are very fine and have preferably a particle size between 15 to 20 microns and 200 mesh. The hardness of the dried gel makes it expensive to pulverize the mass sufficiently fine for use in such a process.

Consequently, it is the primary object of this invention to prepare a dried gel of improved quality, particularly with respect to ease of powdering.

It is a further object of this invention to prepare finely powdered gels of high quality and low density.

According to the present invention, an improved and easily powdered gel of low density is prepared by precipitating a hydrous oxide as a gel, treating the precipitated gel with a water-soluble organic liquid which has substantially no solvent action on the gel and removing the liquid by vaporization at atmospheric pressure. According to one modification, the gel may be precipitated from a solution of the salt in the water-soluble organic liquid which may contain as much as 80% water, but preferably not more than 10%. According to another modification of the invention, the hydrous oxide is first precipitated from a solution of the salt in water and the water then replaced with the water-soluble organic liquid by washing the resulting aquagel with the organic liquid. In either case, the removal of the organic liquid yields products which are easily pulverized into very low density fine particles.

This property of low density is particularly characteristic of the gels prepared according to this invention and makes them particularly suited as the support of contact catalysts.

Suitable water-soluble organic liquids which may be used in treating the precipitated gel according to this invention are alcohols, such as methanol, ethanol, propanol, isopropanol, tertiary butanol, etc., ketones, such as acetone, methyl ethyl ketone, di-ethyl ketone, etc., and other water-soluble compounds, such as acetic acid, dioxane, ethylene oxide, etc. If desired, the alcohol or other water-soluble liquid may subsequently be replaced by a non-polar fluid, such as propane or butane. Protective colloid and other stabilizing agents may be present.

The process of this invention is not limited to synthetic gels but may also be applied to other materials, such as wet bentonites, clays, etc., to give lighter materials having a finer particle size by extracting the water with a non-aqueous fluid, such as alcohol, and then driving off the alcohol.

The following experiments are given to indicate in general the preparation of the gels according to this invention, and while they are illustrative, they are not given with the intent of limiting the scope of the invention to the specific instances presented:

Example 1

A colloidal silica solution was prepared by stirring 2½ liters of a solution containing 517 cc. of water glass, having a specific gravity of 1.38, into 2½ liters of a solution containing 200 cc. of concentrated hydrochloric acid. One liter of this solution was diluted to 2320 cc. with distilled water and 233 cc. of a solution containing 57 grams of $AlCl_3.6H_2O$ were added. The alumina and silica were then precipitated with 360 cc. of 2.8% aqueous ammonia solution. After thorough washing with water, the precipitate was dried at atmospheric pressure to a hard, lumpy product. This product was then ground according to a standard procedure by passing the dried gel twice thru a rotating disc grinder with a set clearance. After grinding, it had an apparent density of 0.5 gram per cc.

*Example 2*

A solution of 103 cc. of waterglass in 200 cc. of distilled water was poured slowly into a stirred solution of 40 cc. of concentrated hydrochloric acid in 160 cc. of water and 500 cc. of 98% isopropyl alcohol. A solution of 57 grams of $AlCl_3.6H_2O$ in 130 cc. of water and 100 cc. of isopropyl alcohol were added. This solution was diluted with 1320 cc. of isopropyl alcohol and neutralized with a solution of 80 cc. of concentrated ammonium hydroxide in 200 cc. of water and 460 cc. of isopropyl alcohol. The precipitate was filtered, washed with 5 liters of water, dried at atmospheric pressure and ground in the same manner as above. The product had an apparent density of 0.281 gram per cc. and the particles were much smaller than those in Example 1.

*Example 3*

316 cc. of ethyl silicate and 493 cc. of 98% isopropyl alcohol were added to 195 cc. of a solution containing 71 grams of $AlCl_3.6H_2O$ in water. After standing 16 hours, this solution was diluted with 2.4 liters of distilled water and the oxides precipitated with 480 cc. of 2.8% ammonia solution. After thorough washing with water and drying at atmospheric pressure, the product was soft and easily converted into a powder. The apparent density of the product was 0.38 gram per cc. and the particles, after grinding in the same manner as in Example 1, were smaller than those in Example 1.

*Example 4*

1 liter of the silica solution described in Example 1 was added to a solution of 40 grams of agar-agar in one liter of distilled water. This was diluted with 1100 cc. of water and 233 cc. of a solution containing 57 grams of $AlCl_3.6H_2O$ and filtered. The alumina and silica were then precipitated from the solution with 360 cc. of 2.8% ammonia solution and filtered and washed. Half of the precipitate was dried at atmospheric pressure to give a hard, glassy product which had an apparent density of 0.6 gram per cc. The particles were much larger than those of Example 1.

*Example 5*

The remaining portion of the precipitate formed in Example 4 was washed with 5 liters of 98% isopropyl alcohol in 2 extractions and dried and ground as in Example 1. The resulting product had an apparent density of 0.15 gram per cc. and the particles were in the range between 20 microns and 200 mesh.

The above examples indicate clearly that finely powdered particles having a very low density can be obtained by treating a precipitated gel with a water-soluble organic liquid and then drying the gel at atmospheric pressure to remove the liquid. This fact is particularly indicated in Examples 4 and 5 in which a silica-aluminum gel was precipitated in water in the presence of agar-agar as a protective colloid. When the gel was dried directly from this aqueous solution, the product had relatively high apparent density of 0.6 gram per cc., was a hard, glassy product, difficult to reduce to powder. However, when the water was removed from the same precipitate by extracting with 98% isopropyl alcohol and then dried, the resulting gel had a much lower apparent density of 0.15 gram per cc., and was easily reduced to a fine powder.

The direct precipitation of a gel in an organic liquid solution is shown in Example 2 in which a silica-alumina gel is precipitated in the presence of isopropyl alcohol. When dried and ground, the product had a very low apparent density of 0.281 and the particles were smaller than those obtained in Example 1 in which the gel was dried from an aqueous solution.

It is thus apparent that this invention discloses a method of preparing finely divided catalysts having particle sizes within the range desired in the catalytic conversion of hydrocarbons. While the above examples describe aluminum silicates, the method of this invention applies equally well to other hydrous gelatinous precipitates, such as oxides, hydroxides, sulfides, etc. of such elements as silicon, aluminum, titanium, iron, chromium, magnesium, zirconium, tin, tungsten, molybdenum, manganese, nickel, cobalt, platinum, etc., and their mixtures, such as silica-magnesia, alumina-boria, alumina-chromia, alumina-molybdena, etc.

The nature and objects of the present invention having thus been set forth and specific examples illustrative of the same given, what is claimed as new and useful and desired to be secured by Letters Patent is:

1. A method of producing a dry, easily pulverized xerogel which comprises forming a silica sol from an inorganic silicate in the presence of an alcohol, thereafter adding an inorganic salt capable of forming a hydrous oxide, converting said salt into the oxide, washing the resulting product with water and drying the same.

2. In the process defined by claim 1, the further improvement wherein the inorganic salt comprises an aluminum salt.

3. A method of producing a dry, easily pulverized xerogel which comprises forming a silica sol from an inorganic silicate in the presence of an alcohol, thereafter adding aluminum chloride to said sol, precipitating the aluminum chloride by the addition of ammonia, washing the resulting product and drying the same.

KENNETH K. KEARBY.

REFERENCES CITED

The following references are of record in the file of this patent:

UNITED STATES PATENTS

| Number | Name | Date |
|---|---|---|
| 2,166,868 | Jones | July 18, 1939 |
| 2,188,007 | Kistler | Jan. 23, 1940 |
| 1,584,716 | Behrman | May 18, 1926 |
| 2,285,449 | Marshall | June 9, 1942 |
| 2,232,727 | Peterkin et al. | Feb. 25, 1941 |
| 2,356,773 | Marshall | Aug. 29, 1944 |
| 2,097,634 | Malan et al. | Nov. 2, 1937 |
| 1,793,350 | Bader et al. | Feb. 17, 1931 |
| 2,093,454 | Kistler | Sept. 21, 1937 |
| 2,342,249 | Burk | Feb. 22, 1944 |
| 2,317,803 | Reeves et al. | Apr. 27, 1943 |

OTHER REFERENCES

Ind. & Eng. Chem., vol. 32, No. 12, Dec. 1940, page 1608.